United States Patent [19]
Kraft et al.

[11] Patent Number: 5,707,075
[45] Date of Patent: Jan. 13, 1998

[54] PROTECTING APPARATUS

[75] Inventors: Josef Kraft, Berg; Hermann Reulein, Neuss; Joachim Franz, Waldaschaff; Martin Kreuzer, Kleinwallstadt, all of Germany

[73] Assignee: MST Automotive GmbH, Aschaffenburg, Germany

[21] Appl. No.: 211,921

[22] Filed: Apr. 25, 1994

Related U.S. Application Data

[60] Provisional application No. 60/EP92/02635, Nov. 12, 1992, abandoned.

[30] Foreign Application Priority Data

Nov. 15, 1991 [DE] Germany .................. 41 37 749.4

[51] Int. Cl.$^6$ .................. B60R 21/08; B60R 21/22
[52] U.S. Cl. .................. 280/730.2; 280/749; 280/753
[58] Field of Search .................. 280/730.2, 730.1, 280/749, 753, 748, 728.1, 733; 180/274, 282

[56] References Cited

U.S. PATENT DOCUMENTS

| | | | |
|---|---|---|---|
| 1,256,848 | 2/1918 | Uttz | 280/753 |
| 1,936,251 | 11/1933 | McCullough | 280/749 |
| 3,650,542 | 3/1972 | Shimano et al. | 280/749 |
| 3,687,485 | 8/1972 | Campbell | 280/749 |
| 5,265,903 | 11/1993 | Kuretake et al. | 280/730.2 |
| 5,322,322 | 6/1994 | Bark et al. | 280/730.2 |
| 5,462,308 | 10/1995 | Seki et al. | 280/730.2 |

FOREIGN PATENT DOCUMENTS

| | | | |
|---|---|---|---|
| 2-249740 | 10/1990 | Japan | 280/730.2 |
| 962946 | 7/1964 | United Kingdom | 280/749 |

*Primary Examiner*—Peter C. English
*Attorney, Agent, or Firm*—Sprung Kramer Schaeffer & Briscoe

[57] ABSTRACT

For the protection of the occupants of a vehicle in case of a lateral impact, restraints (3) are integrated in the side structure of the vehicle and are adapted to be automatically stretched to extend tautly on the inside across the window opening and are connected to an airbag unit (25) for protection in case of an impact, which unit is accommodated adjacent to the side structure of the vehicle.

9 Claims, 5 Drawing Sheets

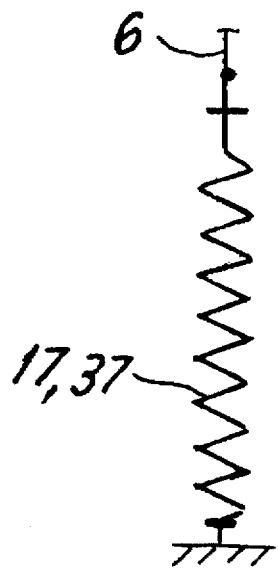
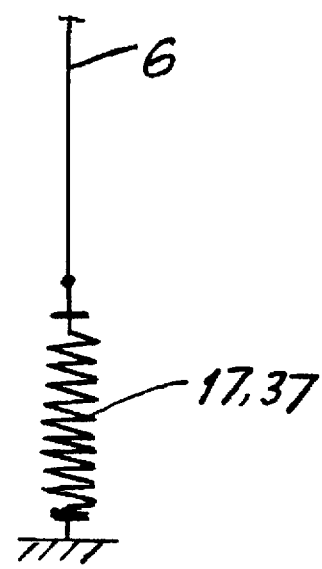
FIG.6a  FIG.6b
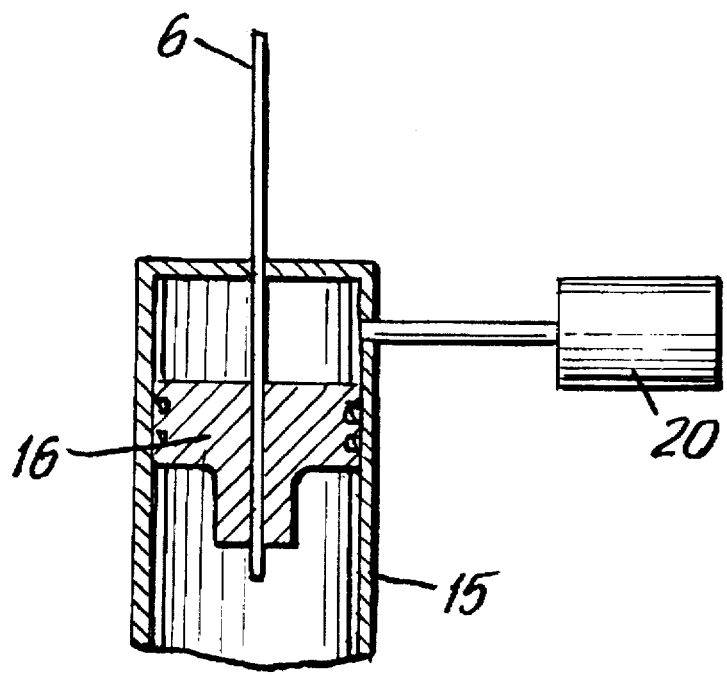
FIG.7

PROTECTING APPARATUS

This is a continuation of PCT/EP92/02635, filed Nov. 12, 1992, abandoned with respect to the United States.

BACKGROUND OF THE INVENTION

1. Field of the Invention

This invention relates to an apparatus for protecting the occupants of a vehicle, preferably a motor car, in case of a lateral impact, consisting of restraining means, which are integrated in the side structure of the vehicle and which are adapted to be extended in case of a lateral impact by an automatically responding actuator, which causes traction means to stretch the restraining means to extend tautly on the inside across the window opening of the side structure.

2. Description of the Prior Art

Lateral impacts of a vehicle on a massive obstacle account for about 35% of all accidents and cause the head of the occupant of the vehicle to turn aside in a sense which is opposite to the direction of the shock produced by the lateral impact. An impact of the head of an unprotected occupant of a vehicle on the side structure of the vehicle, particularly on the windowpanes, may result in considerable injury to the skull. The cervical spine of the occupant of the vehicle may be injured if the side windowpanes of the vehicle nave been destroyed by the lateral impact and the paneless window opening. In order to distinctly reduce the risk of such injuries in case of an accident and thus to increase the passive safety, DE-A-2,249,988 proposes to provide adjacent to the head of she occupant of the vehicle for protection in case of an impact a unit, which is accommodated in the roof side frame adjacent to the head of the occupant and comprises an airbag, which when inflated is disposed between the head of the occupant of the vehicle and the side structure of the vehicle. DE-C-3,422,253 describes an apparatus which serves to protect occupants of a vehicle in case of a lateral impact and in which the deformation of the body of the vehicle causes a variable-volume gas generator arranged near the side structure of the vehicle to inflate an airbag, which is provided in the roof side rail. GB-A-2,220,620 shows for protection in case of an impact a unit which is accommodated in the door of a vehicle and comprises an airbag, which in case of a lateral impact is inflated and intended to move between the occupant of the vehicle and the side wall of the vehicle. In accordance with DE-A-3,741,637 a protection in case of a lateral impact of the vehicle is afforded in that at least one forwardly projecting side cheek is provided in the backrest of the seat in the region in which the backrest supports the shoulders of the occupant of the vehicle and said cheek contains an inflatable airbag. Attention is also directed to DE-A-4,018,470, which shows an apparatus for protection in case of a lateral impact of a vehicle and comprise for protection in case of an impact a unit, which is accommodated in the side portion of the backrests of the seat of the vehicle and comprises an airbag and moves between the occupant of the vehicle and the side structure of the vehicle. The FR-A-2,122,189 describes restraining means for the occupants of a motor car formed by nets which in case of an impact are deployed across the openings of the car body, at which an inflatable cushion delays cables connected to the nets along a predetermined tear line.

The strong turning aside of the head of the occupant of the vehicle will not he sufficiently prevented by an inflated airbag of a unit for protection in case of an impact, which unit is accommodated in a lateral region of the vehicle, if the lateral impact of the vehicle has caused the lateral windowpanes to be destroyed and the inflated airbag emerges out of the interior of the vehicle through the window opening. In that case the conversion of energy in the airbag is not effected as desired because there is no opposing force.

SUMMARY OF THE INVENTION

It is an object of the present invention to provide an apparatus which serves to protect the occupant of a vehicle in case of a lateral impact and by which the turning aside of the head of the occupant of the vehicle will be limited even in case of a destruction of the side windowpanes and simultaneously the head will gently be cushioned without exerting strong rebound forces.

That object is accomplished by the combination of the restraining means described first hereinbefore with an air bag unit for protection in case of an impact, which unit is integrated in the side structure of the vehicle and the airbag of which in its inflated state is disposed between the restraining means which extend tautly between the window opening and the occupant of the vehicle after the restraining means have first been stretched to extend tautly on the inside across the window opening of the vehicle door in the first phase. In that case it will be ensured that the airbag cannot be forced out of the vehicle through the paneless window opening as a result of an impact of the head which is turning aside; in such case the protective function of the airbag would no longer be ensured.

According to a further feature of the invention the restraining means comprise a two-dimensional textile fabric, particularly a woven fabric, knitted fabric, braided fabric or net, which is folded together and stowed away in a non-activated state.

To ensure that the restraining means will reliably be stretched to extend on the inside across the window opening, the traction means are guided and are adapted to be locked when the restraining means have reached their active position.

According to a further feature of the protecting apparatus in accordance with the invention the actuator consists of a prestressed spring element.

The actuator preferably comprises a fluid-operable piston-cylinder unit, which is connected to a gas generator, which is filled with compressed air or with a solid propellent charge, which is adapted to be primed.

The actuator, the traction means and the restraining means are suitably accommodated in the structure of the door frame. Alternatively the actuator, the traction means and/or the restraining means can be accommodated in those portions of the body of the vehicle which are adjacent to the door frame.

In dependence on the arrangement of the stowage space for the restraining means when folded together, the restraining means can he stretched from back to front, from front to back, from top to bottom, from bottom to top or in a diagonal direction to extend on the inside across the window openings of the side structure of the vehicle.

An optimum protection will be afforded if in accordance with the invention the airbag of the unit for protection in case of an impact and the restraining means and/or the traction means are interconnected in such a manner that in case of a lateral impact the airbag and the restraining means are initially extended in a surface and the airbag is subsequently inflated.

The unit for protection in case of an impact, which unit comprises an airbag, is suitably accommodated in the door.

Alternatively that unit may be accommodated adjacent to the floor side rail, the roof side rail, the door posts, particularly the intermediate post, the so-called B post, or in that portion of the roof of the body of the vehicle which is adjacent to the roof side rail.

BRIEF DESCRIPTION OF THE DRAWINGS

The invention is illustrated by way of examples in the drawings and will be described more in detail hereinafter.

FIG. 6A and FIG. 6B show prestressed and release spring elements.

FIG. 7 shows a piston-cylinder unit and gas generator; and

DESCRIPTION OF THE PREFERRED EMBODIMENTS

Figure 1:
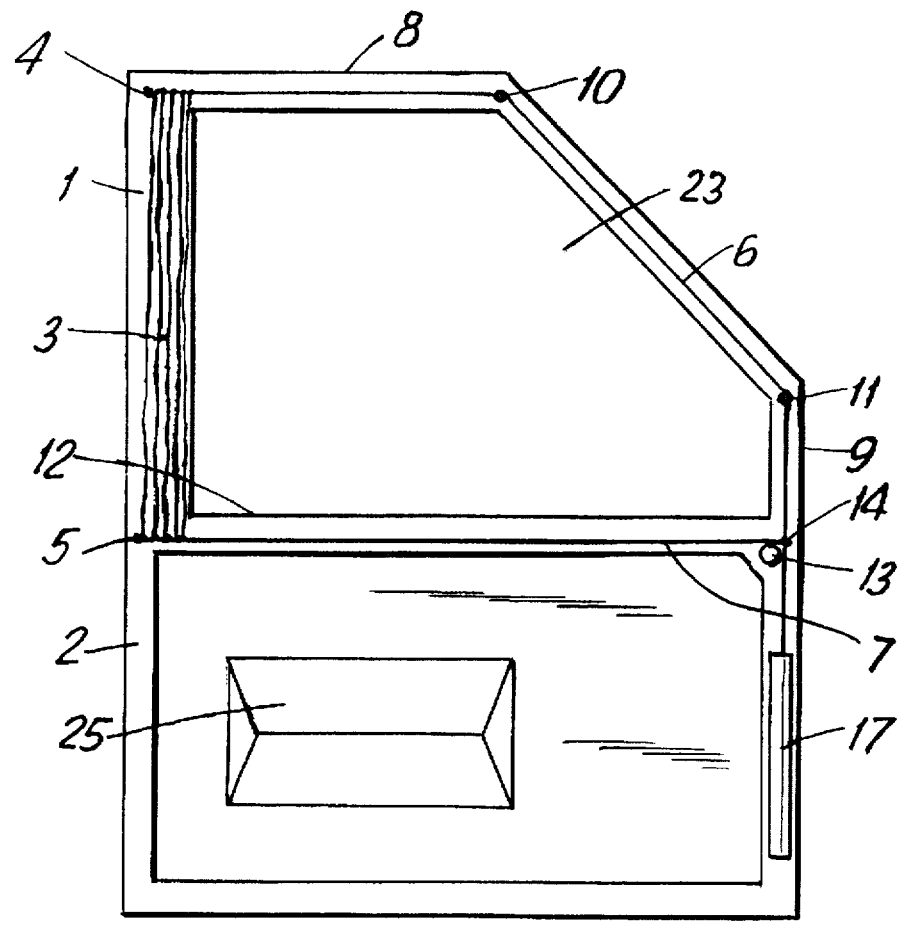
FIG. 1 is a longitudinal sectional view showing a door of a motor car and a protecting apparatus accommodated in the parts of the door frame.
Figure 2:
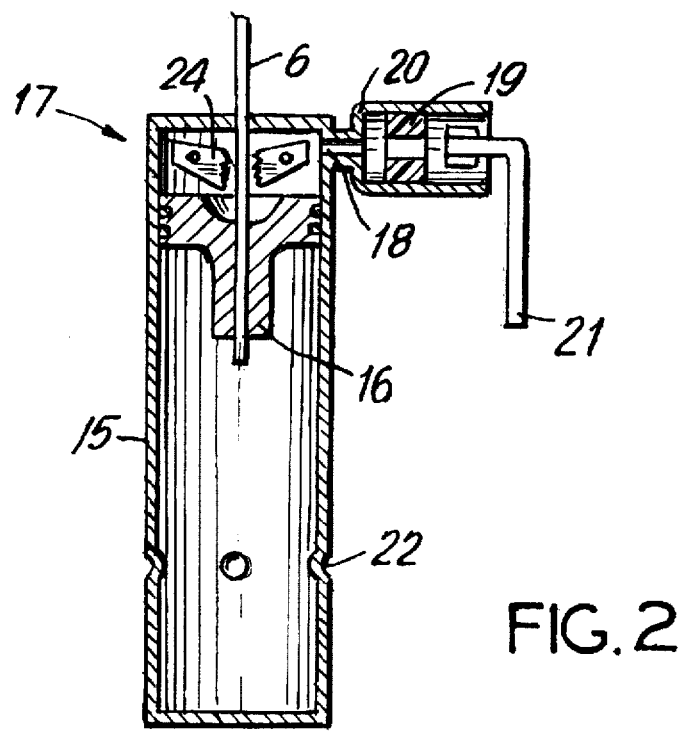
FIG. 2 is a longitudinal sectional view showing a piston-cylinder unit which serves as an actuator for the restraining means.
Figure 3:
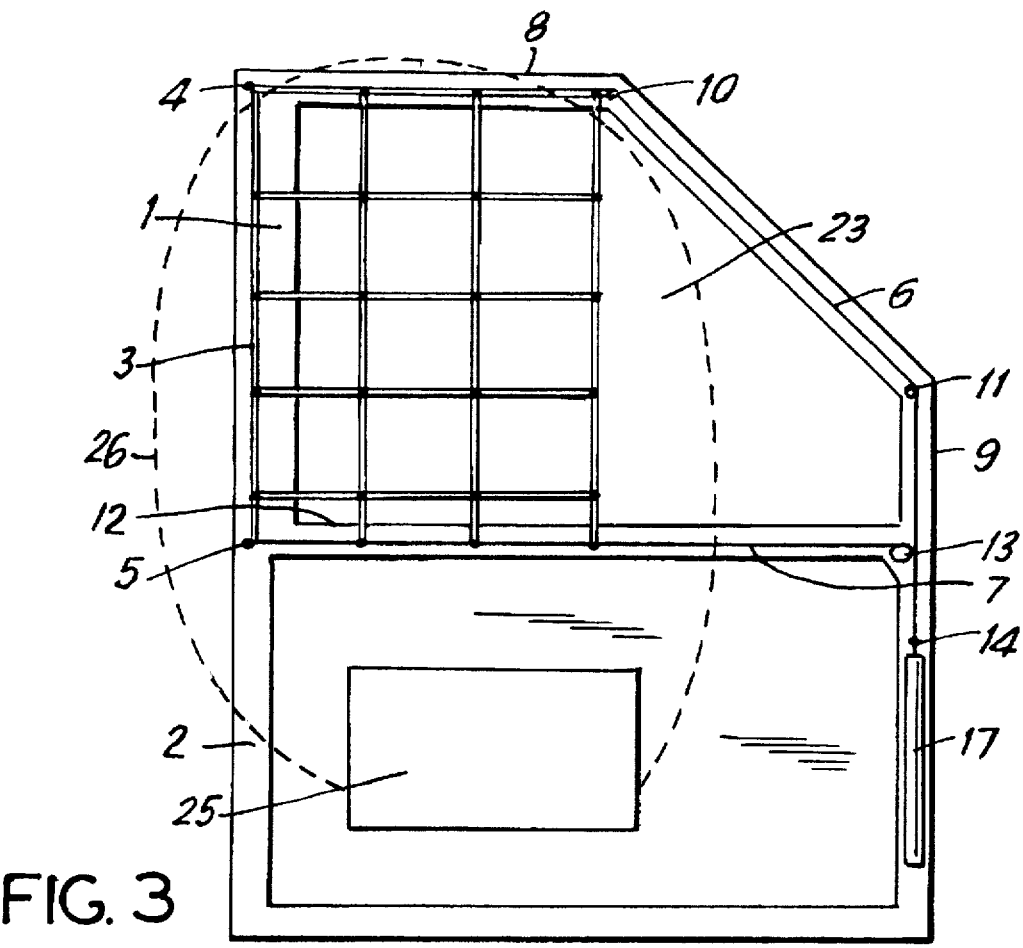
FIG. 3 is a longitudinal sectional view showing the door of a motor car as shown in FIG. 1 with an activated protecting apparatus.
Figure 4:
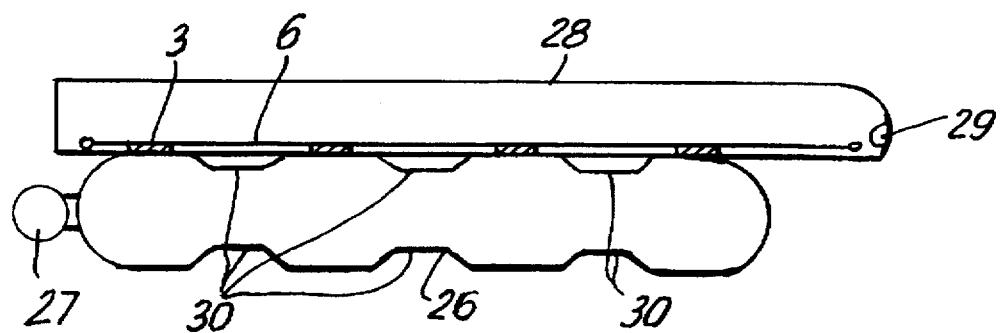
FIG. 4 is a transverse sectional view showing the door of a motor car and an activated protecting apparatus.

A net (3), which s folded together and in case of a lateral impact serves as restraining means, is accommodated in the upper portion (1) of that part of the door frame (2) which is adjacent to the B post af the body, not shown, of the vehicle. That net (3) is secured adjacent to its top and bottom corners next to the B post to the door frame (2) by fixing means (4, 5). The other corners of the net are secured to traction ropes (6, 7). The upper traction rope (6) extends in the top and front portions (8) and (9) of the door frame (2) and is trained around the deflecting rollers (10, 11). The lower traction rode (7) extends in the intermediate horizontal portion (2) of the door frame (2) and is trained around the deflecting roller (3) and is fixed to the upper rope (6) at the point (14). The upper traction rope (6) is secured to a piston (16), which is slidable in the cylinder (15) and together with said cylinder constitutes a piston-cylinder unit (17), which serves to actuate the net (3). A gas generator (20), which is provided with a solid propellant charge (19), is connected to the overflow opening (18) of the cylinder (15). The solid propellant charge (19) is ignited by an igniting line (21), which is connected to a sensor, not shown. As a result of that ignition, gas flows suddenly into the cylinder (15) and displaces the piston (16) as far as to a stop (22), which is provided on the inside surface of the cylinder (15); according to FIG. 3 the traction ropes (6) and (7) are tensioned at the same time so that the net (3) is stretched to extend tautly on the inside across the surface of the window opening (23) of the door frame (2). When the piston (16) has reached its end position, the traction rope (6) is fixed by the clamping jaws (24), which are attached to the top end of the cylinder (15). The unit (25) which is accommodated in the lower part of the door and serves for protection in case of an impact and comprises an airbag (26) is also activated so that the airbag (26) is inflated to extend between the side structure of the vehicle and the occupants of the vehicle as sown by the dotted line of FIG. 3. According to FIG. 4 the airbag (26), which is inflated by the gas generator (27), has been sewn to the net (3).

These combinations will prevent the airbag (26) from emerging through the paneless window opening (23) of the door (28), which is mounted by the hinge (29) on the front post (A post) of the body of the vehicle. At the necking (30) of the airbag (25) the inside skin has been sewn to the outside skin of the airbag whereby the inflated airbag has a flat form and therefore will be requiring a short-time inflating.

Figure 5:
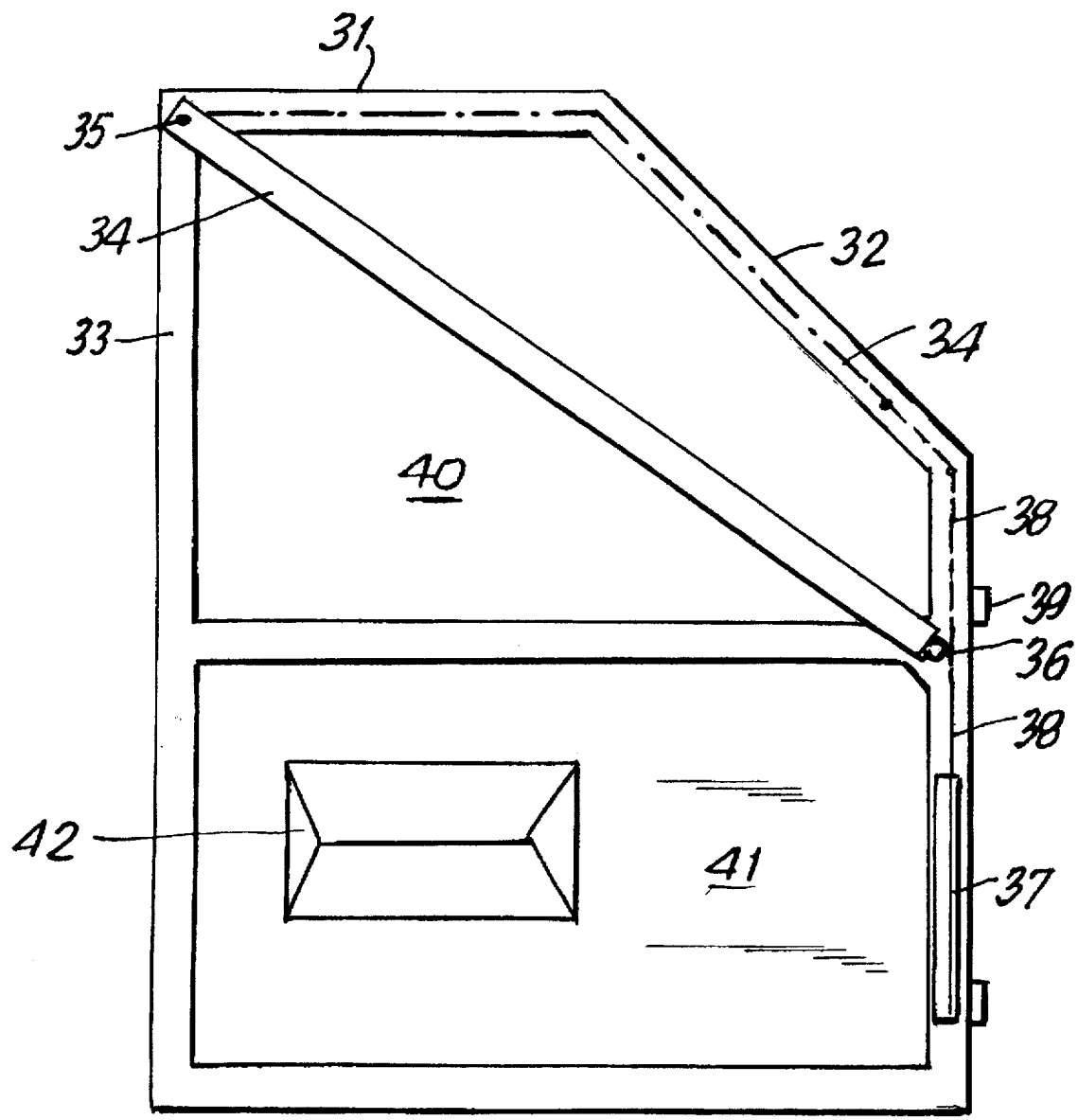
FIG. 5 is a longitudinal sectional view showing the door of a motor car with an activated protecting apparatus.

According to FIG. 5 the top and front portions (31, 32) of the door frame (33) enclose ribbon-like restraining means (34) shown by the dash-dotted line. The one end of the ribbon-like restraining means (34) is fixed to the door frame (33) by a stop (35) and the other end is fixed to a traction rope (38) which is trained around the roller (36) and fixed to the piston-cylinder unit (37). The piston-cylinder unit (37) is actuated by a gas generator provided with a solid propellant charge and the ribbon-like restraining means (34) are diagonally stretched across the window opening (40) from the upper corner of the door frame (33) near the B post of the car body to the lower corner of the window opening (40) near the upper hinge (39) of the front post (A post). In the lower part (41) of the door an airbag unit (42) is enclosed.

FIG. 6A and 6B show a prestressed and release spring element 17, 37. The upper end of the spring element is connected to the rope. When the spring is released, it is as shown in FIG. 6B.

FIG. 7 shows a piston-cylinder unit 15, 16 and a gas generator 20 filled with compressed air.

Figure 8:
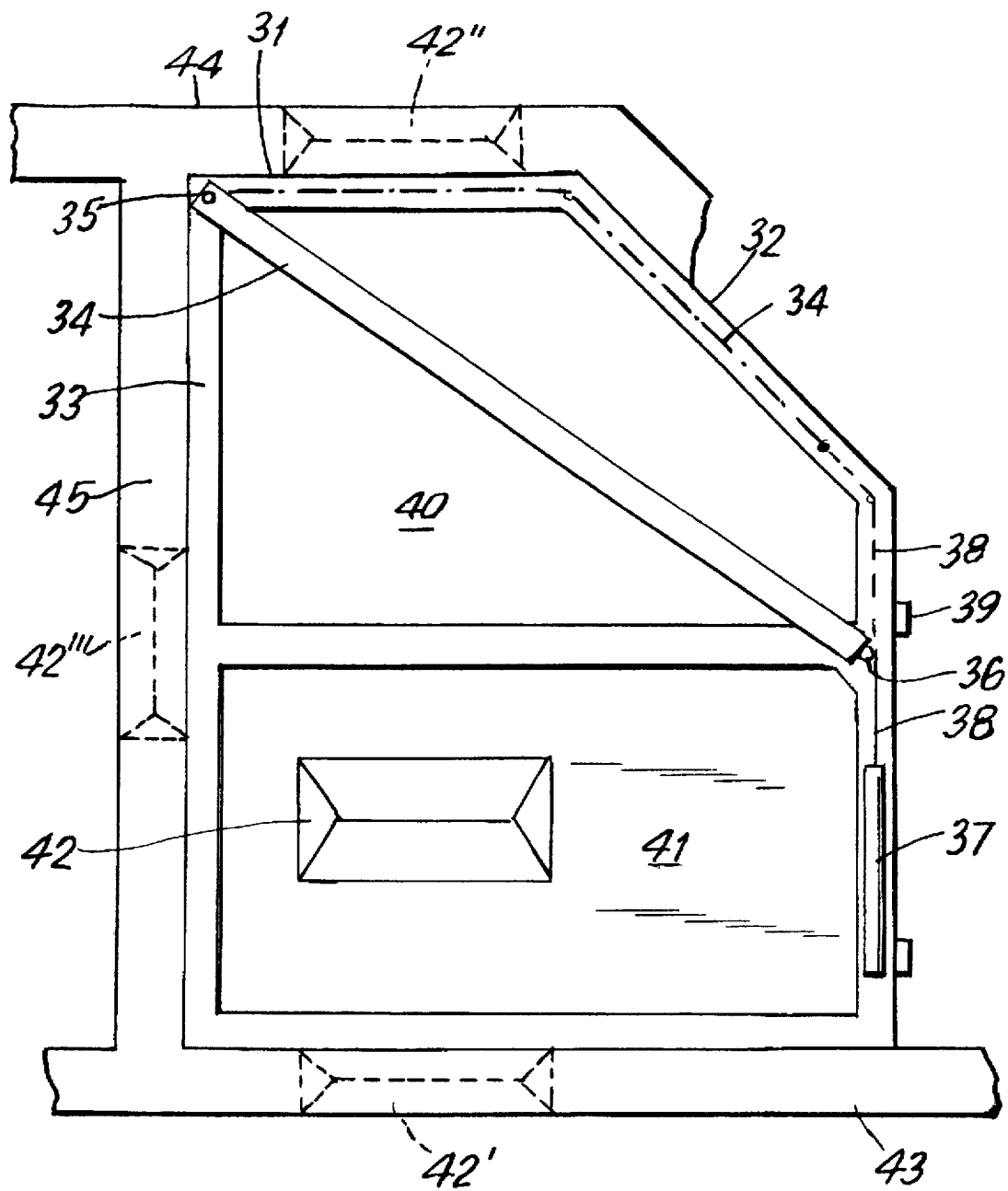
FIG. 8 shows a modified FIG. 5 with an additional floor side rail, roof side rail and door post.

FIG. 8 shows posts 43–45 in which the units 42', 42" and 43'" may be located.

In case of a lateral impact the head of the occupant of the vehicle, at first contact of the vehicle with an obstacle at the time t=0 millisecond may cause the head of the occupant of the vehicle owing to its inertia to move toward the side structure of the vehicle opposite to the direction of the shock. After about 5 milliseconds the restraining means and he airbag in surface contact with the restraining means extend on the inside across the window opening. Thereafter the inflation of the gas airbag is initiated; that inflation takes 25 milliseconds. After 30 milliseconds the head strikes on the airbag when it has fully been inflated. The net prevents the airbag from emerging through the paneless window opening. Because the gas can escape from the airbag through exit openings in a controlled manner, the head will be cushioned gently and strong rebound forces will not be exerted.

We claim:

1. An apparatus for proecting the occupants of a vehicle, in case of a lateral impact, comprising in combination restraining means, which are integrated in a side structure of the vehicle and which are adapted to be extended in case of a lateral impact by an automatically responding actuator, which causes traction means to stretch the restraining means to extend tautly on the inside across a window opening of the side structure, in combination with an airbag unit (25, 42) for protection in case of an impact, which unit is integrated in the side structure of the vehicle and the airbag (26) of which in its inflated state is disposed between the restraining means which extend tautly across the window opening (23, 40) and the occupant of the vehicle.

2. A protecting apparatus according to claim 1, characterized in that the restraining means (3, 34) comprise a two-dimensional textile fabric, which is folded together and stowed away in a non-activated state.

3. A protecting apparatus according to claim 2, characterized in that the restraining means (3, 34) comprise a woven or knitted or braided fabric or a net.

4. A protecting apparatus according to claim 1, wherein the traction means (6, 7, 38) are guided and are adapted to be fixed when the restraining means (3, 34) have reached their activated state.

5. A protecting apparatus according to claim 1, characterized in that the actuator (17, 37) consists of a pre-stressed spring element.

6. A protecting apparatus according to claim 1, characterized in that the actuator (17, 37) comprises a fluid-operable piston-cylinder unit (15, 16).

7. A protecting apparatus according to one of the claims 1 to 6, characterized in that the airbag (26) of the unit (25, 42) for protection in case of an impact and the restraining means (3, 34) or the traction means (6, 7, 38) are firmly interconnected.

8. A protecting apparatus according to claim 1, characterized in that the unit (25, 42) comprising an airbag and serving for protection in case of an impact is accommodated in the door.

9. A protecting apparatus according to claim 1, characterized in that the unit (25, 42) serving for protection in case of an impact and comprising an airbag is accommodated adjacent to a floor side rail, a roof side rail, the door posts, intermediate post, a B post, or in that portion of the roof of the body of the vehicle which is adjacent to the roof side rail.

* * * * *